United States Patent [19]

Burche et al.

[11] 4,353,402
[45] Oct. 12, 1982

[54] SLITTED TIRE TREAD

[75] Inventors: Ioan A. Burche; Edwin T. Brodie, both of Muscatine, Iowa

[73] Assignee: Bandag Incorporated, Muscatine, Iowa

[21] Appl. No.: 69,187

[22] Filed: Aug. 23, 1979

Related U.S. Application Data

[63] Continuation of Ser. No. 916,108, Jun. 16, 1978, abandoned, which is a continuation of Ser. No. 836,739, Sep. 26, 1977, abandoned, which is a continuation of Ser. No. 441,815, Feb. 12, 1974, abandoned.

[51] Int. Cl.³ .................. B60C 11/06; B60C 11/12
[52] U.S. Cl. ............................................. 152/209 R
[58] Field of Search ...... 152/209 R, 209 BD, DIG. 3

[56] References Cited

U.S. PATENT DOCUMENTS

| D. 62,952 | 8/1923 | Holloway | 152/209 D |
|---|---|---|---|
| D. 115,834 | 7/1939 | Lambourn | 152/DIG.3 |
| 2,186,180 | 1/1940 | Sloman et al. | 152/DIG. 3 |
| 2,821,231 | 1/1958 | Kraft | 152/DIG. 3 |
| 3,570,571 | 3/1971 | Riches | 152/209 R |
| 3,727,661 | 4/1973 | Hoke | 152/209 R |
| 3,739,828 | 6/1973 | Schaevitz | 152/209 R |
| 3,926,238 | 12/1975 | Vorih | 152/209 R |

Primary Examiner—Michael W. Ball
Attorney, Agent, or Firm—Cushman, Darby & Cushman

[57] ABSTRACT

Tire treads are designed to be receptive to the technique of cutting parallel slits therein for the purpose of improving traction and wear life. In order to obtain the advantages of slitting while avoiding cracking and breaking off of tread elements during use, the slit angle, general guides for the tire size and type and slit depth should be chosen within prescribed limits, and additional voids such as shoulder grooves, cross grooves and cross molded voids should be parallel to the slits. Tie bars integral at their ends with tread elements extend across the tread grooves to provide lateral support for the tread elements.

3 Claims, 12 Drawing Figures

Fig. 1.
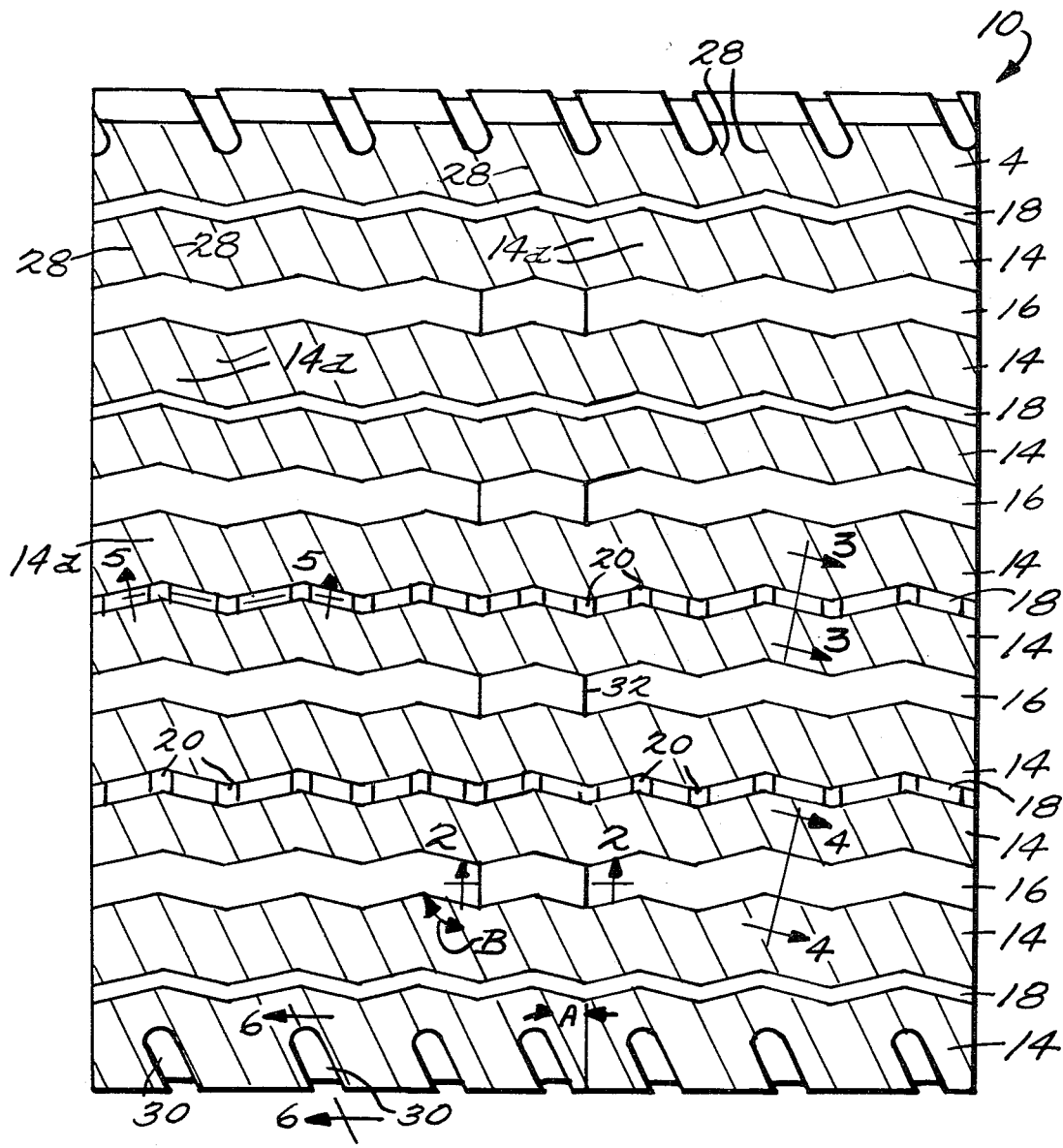
Fig. 2. Fig. 3. Fig. 4.
  
Fig. 5. Fig. 6.
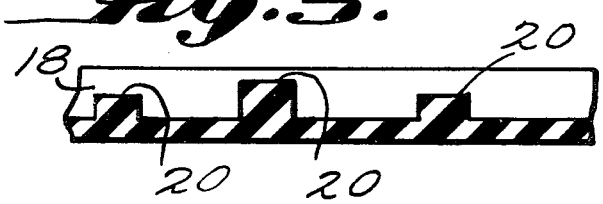 

SLITTED TIRE TREAD

This is a continuation of application Ser. No. 916,108 filed June 16, 1978, now abandoned, as a continuation of application Ser. No. 836,739 filed Sept. 26, 1977, now abandoned, which in turn is a continuation of application Ser. No. 441,815 filed Feb. 12, 1974, now abandoned.

This invention relates to improving tire tread traction and wear life by cutting slits in the tread and more particularly to the design and configuration of the tread to be receptive to advantages of slitting.

The technique of slitting tire treads to improve their traction and wear life is known. The slits are formed parallel to each other at an angle to the longitudinal dimension of the tread by special machinery which employs one or more thin sharp knives to penetrate the tread to a substantial depth. Since treads are typically formed as a plurality of circumferentially extending tread ribs alternating with circumferentially extending major and minor tread voids or grooves, the slitting of the ribs forms a large number of individual upstanding tread elements which are integral at their bases with the undertread portion. These tread elements are, therefore, subject to being torn away from the undertread portion during road use. The tread ribs may also be in the form of distinct lugs parallel to each other and extending at an angle to the longitudinal or circumferential dimension of the tread. In this case the tread grooves are the spaces between lugs.

The present invention is directed toward an improved tread construction in which the tread ribs, tread voids or grooves and slits are interrelated in a manner to produce an optimum combination of traction and strength. The invention is particularly concerned with providing the proper relationship in precured rubber tread strips which are subsequently to be used for retreading tires or for making new tires. At the same time, the present invention can be applied to any new tires or retreaded tires wherein the design parameters given are followed. The external contour of tread area can be flat, convex, or concave. Accordingly, the term tread means either a tread which is separate from a tire or which is part of a complete tire.

A number of variables are present in a tread slitting operation, including the angle of the parallel slits relative to the circumference or to the transverse dimension of the tread, the angle of the parallel slits relative to the tread ribs which are either of zig-zag, serpentine shape or straight, the number of slits per inch, and the depth of the slits. With respect to the tread ribs and grooves themselves, variables which affect performance and strength, when the ribs are slit, include rib width, groove width and groove depth.

Of particular importance in the tread construction of the present invention is the provision of integral tie bars between tread elements lying on opposite sides of the major and minor tread grooves. By a minor tread groove is meant a narrow tread groove which separates two closely-spaced tread ribs and which is narrower than the major grooves. Usually, a group of two or three or more ribs will lie between two major grooves, and the individual ribs in a group will be spaced apart by the minor grooves. By a tie bar is meant a narrow piece of tread rubber extending across a tread groove and being integral with each of two tread ribs. Slitting of the ribs is at such an angle that the slits do not destroy the tying action of the tie bars, and as a result the latter remain integral with two tread elements and thereby aid in reducing or preventing the tearing out of the tread elements during road use. When the tread is a precured strip used for retreading tires the tie bars serve a further useful purpose in that they aid in preventing closing of the tread grooves during the retreading operation in which the tread is pressed against the tire while air is removed from the tread grooves.

Another advantage of the tie bars is that their formation during molding of the tread tends to avoid a defect in the base of those tread ribs which lie in either side of a minor tread groove. These minor tread grooves are formed during the molding operation by the presence of thin metal plates in the mold cavity. It has been found that during pressing of the tread rubber composition these plates sometimes introduce weakening defects in the adjacent tread ribs as a result of the inability of the tread rubber to flow across the "dams" formed by the plates. One such defect has the form of a cured fold extending from the tread groove into the tread rib, usually at the base of the tread rib. When the tread ribs are subsequently slit to improve traction, the slits will penetrate into the ribs a sufficient distance to intersect the fold or other defect. Any tread element having such a defect near its base is likely to tear out during road use. These defects are avoided by the present invention by cutting away or relieving the upper edges of the thin metal plates at longitudinally spaced-apart locations along the mold plates, thereby improving the uniformity of flow of tread material within the mold and evacuation of entrapped air. The entrapped air can also be evacuated by using the well known method of venting where practical. The tie bars in the molded tread result from the flow of tread material into the cut-away portions during the molding operation.

The invention will be further understood from the following more detailed description of several illustrative embodiments, taken with the drawings in which:

FIG. 1 is a plan view of a first embodiment of a flat slitted precured rubber tread strip;

FIGS. 2, 3, 4, 5 and 6 are sectional views taken on the lines 2—2, 3—3, 4—4, 5—5 and 6—6, respectively, of FIG. 1;

Figure 11:
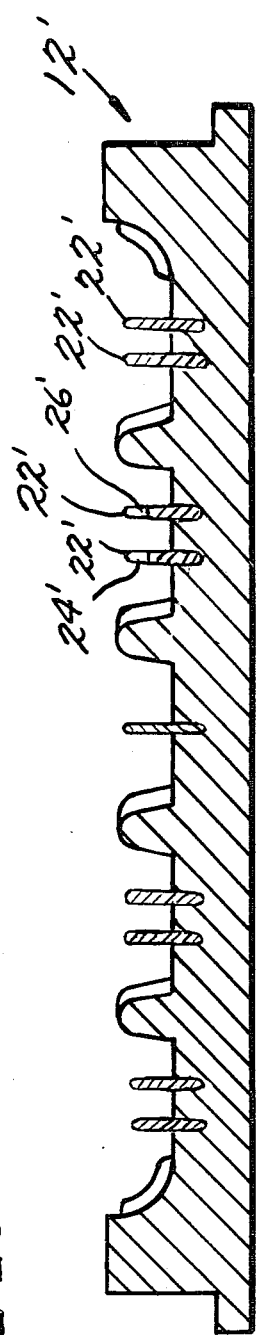
Figure 8:
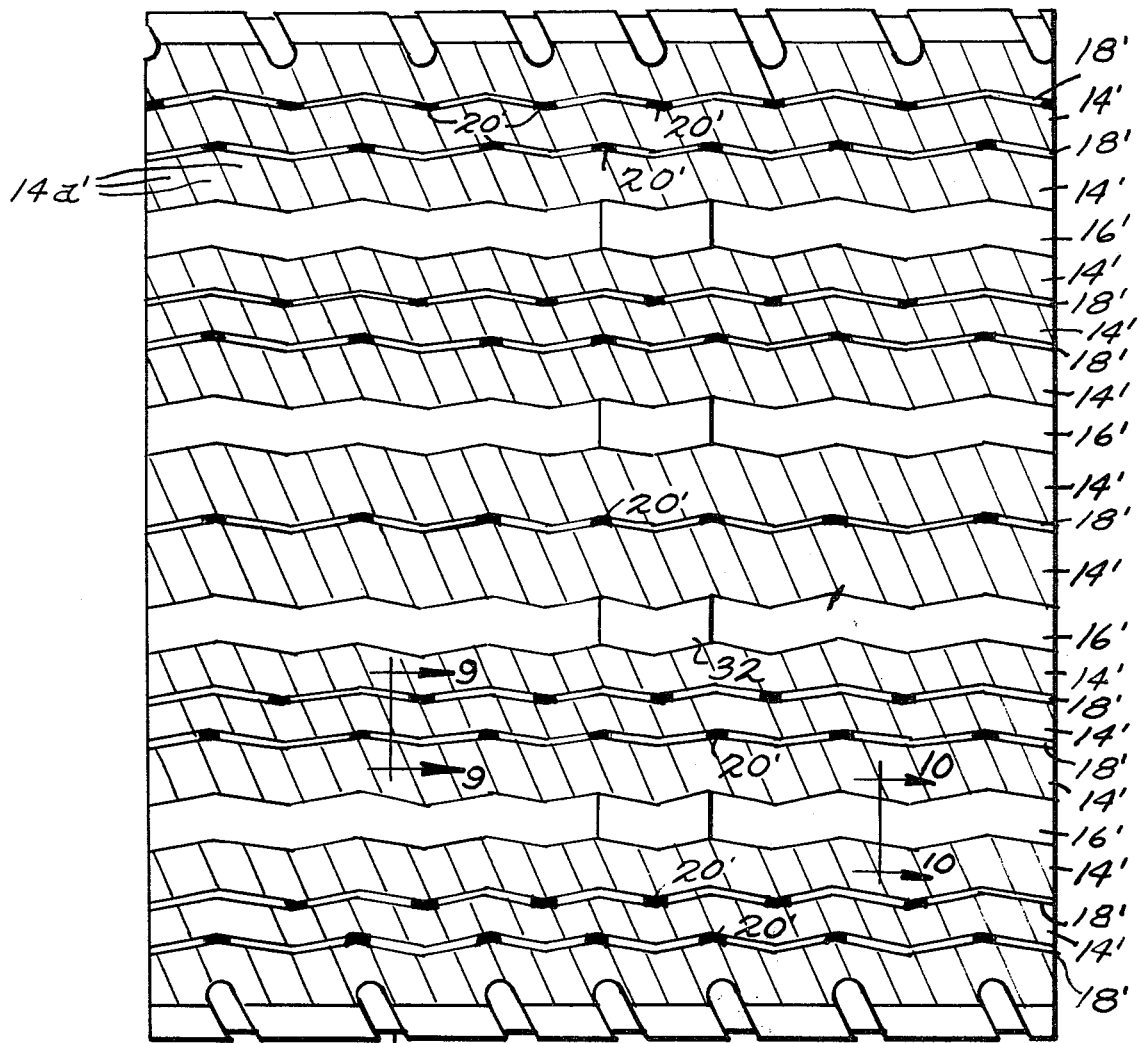
FIG. 8 is a plan view of a second embodiment of a precured rubber tread strip.
Figure 9:
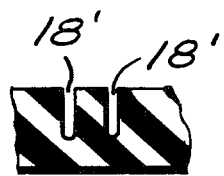
Figure 10:

FIGS. 9 and 10 are sectional views taken on the lines 9—9 and 10—10, respectively, of FIG. 8;

FIG. 11 is a sectional view of a mold for making the tread strip of FIG. 8; and

Figure 7:
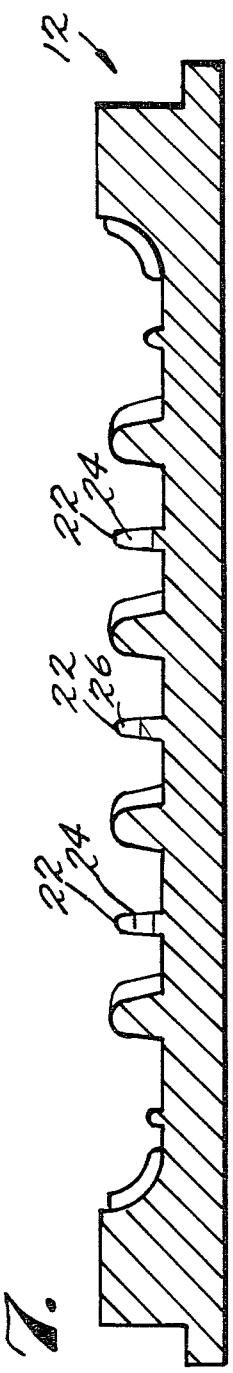
FIG. 7 is a transverse sectional view of a mold for making the tread strip of FIG. 1.
Figure 12:
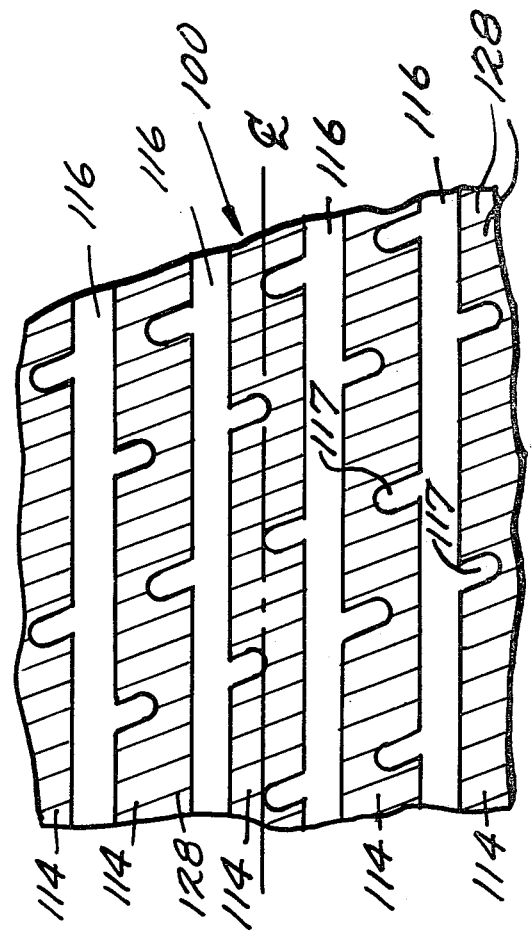

FIG. 12 is a fragmentary plan view of a third embodiment of a slitted precured rubber tread strip;

Referring to FIG. 1, there is shown a plan view of a piece of a precured rubber tread strip 10 which has been molded under high pressure in the mold 12 illustrated in FIG. 7. The particular tread strip 10 which is illustrated includes ten tread ribs 14, four major tread grooves 16 and five minor tread grooves 18. Each rib is of zig-zag configuration in that it has the shape of a plurality of interconnected straight portions which are disposed in alternating angular positions relative to a common longitudinal axis.

The ribs 14 lying on opposite sides of each minor groove 18 are interconnected by integral tie bars 20 which extend transversely across the respective minor groove 18. In the illustrated embodiment the dimensions of the tie bars 20 in the longitudinal direction of the minor grooves are spaced apart along the minor grooves a distance about equal to their longitudinal dimensions, but these relations are not significant. As seen in FIG. 5, a tie bar 20 may partially or completely fill the cross-section of its minor groove 18. As seen from FIG. 7, the mold 12 for forming the tread strip 10 illustrated in FIG. 1 is provided with internal thin metal plates 22 which produce the minor tread grooves 18 of FIG. 1. These thin metal plates 22 are relieved or cut away at longitudinally spaced locations so as to enhance flow of tread composition during molding. As seen in FIG. 7, the upper edge only may be relieved as shown at 24, or an increased height may be relieved as shown at 26. It will be apparent that flow of tread composition into the relieved areas 24 and 26 result in the presence of the tie bars 20 in the molded tread strip 10 illustrated in FIG. 1.

After molding, the tread strip 10 is passed through a suitable machine which produces in the ribs 14 a plurality of traction-producing slits 28 which penetrate the ribs 14 down to about 55% to 95% of the height of the ribs 14 and thereby divide each rib into a plurality of tread elements 14a which are integral at their bases with the undertread portion of the strip 10. The slits 28 extend at an angle A (see FIG. 1) of 25° plus or minus 15° with respect to the transverse dimension of the tread strip 10. The angle of A of the slits is also related to the relative angle of the grooves in that for zig-zag and serpentine grooves (as shown in FIG. 1) an inclination A of 25° plus 15° or minus 0° is recommended. For straight grooves an inclination A of 25° plus 0° or minus 15° is recommended. In addition the relationship between the direction of the slits 28 to the zig-zag edges of the ribs 14 is such that all the slits 28 intersect an edge at angle B between about 45° to 135°.

The number of slits 28 per inch is related to the specific pressure between road and tread elements. For aircraft and truck treads one to three slits per inch is recommended. For motorcycles and passenger tires three to eight slits per inch is recommended.

One of the essential features for successful slitting is that there should be essentially no small tips or fragments of tread rib formed by the slits 28, because such tips or fragments will easily tear out during use. The above-described relationships of slit spacing and slit angle relative to the configuration of the tread ribs 14, are, therefore, very important. Equally important is the requirement that the slits 28 not sever the tie bears 20 between their ends and thereby destroy the strengthening action of the tie bars 20. Normally the longitudinal dimension of a tie bar 20 is great enough so that a slit 28 will not sever it, although a slit 28 may divide a single tie bar 20 into two portions each of which remains integral at its ends with two tread elements 14a.

As seen in FIG. 6, minor tread voids such as shoulder voids 30 should be shaped and disposed relative to the slit angle and spacing so that small tread fragments are not formed. In the illustrated embodiment the shoulder voids 30 have a rounded rectangular shape and are inclined with their longer sides as parallel as possible to the slits 28.

In FIG. 2 is will be seen that the major tread grooves 16 are provided with wear indicators 32 in the form of raised portions on the bottom of the grooves.

Tread groove width is enough to provide for free water passage to prevent hydroplaning, but the ribs 14 must be wide enough to allow the tread elements 14a to be adequately supported by neighboring elements 14a from angular abrasion during use. The ratio of total rib width to total groove width is from 1.5/1 to 8/1 and is a function of the shape of tire construction, tread design, and the depth of the slits. General rules for the ratio of total rib width to total groove width are:

| | |
|---|---|
| For passenger and motorcycle tires: | 1.5/1 to 4/1 |
| For truck tires: | 3/1 to 5/1 |
| For Aircraft tires: | 5/1 to 8/1 |

If these limits are not met the tread may provide insufficient traction and may suffer from tear-out of the elements 14a.

FIGS. 8, 9 and 10 illustrate a second embodiment of a precured tread strip, and FIG. 11 illustrates a mold for making the strip using thin metal plates 22'. Primed reference numerals in these figures designate the same elements designated with unprimed numerals in FIGS. 1-7.

FIG. 12 illustrates a portion of a precured tread strip 100 which is provided with tread ribs 114, and tread grooves 116 and slits 128. Bar grooves 117 extend parallel to the slits 128 from the longitudinal groove 116 into the ribs 114 for enhancing traction in snow. As in the previous embodiments, the relationships are such as to avoid the formation of any tread elements which are so small that they would tear out in use.

It is desirable that the composition of the rubber tread contain at least 25 phr (parts by weight per hundred parts by weight of rubber) of polybutadiene elastomer in order that the tread be easily slit and be resistant to tearing out of the resulting tread elements during road use. The remainder of the tread composition may be the usual elastomers such as natural rubber, butadiene styrene copolymer, or polyisoprene together with other components such as oils, resins and carbon black. The dispersion level of the carbon black, which will normally be present in the proportion of 40–80 phr, during mixing of the tread compound prior to molding should be at least 97% using ASTM Method D2663-69. The surface of the tread before molding should be clean, or a coating agent used to reduce tackiness should be totally soluble in the rubber in order to reduce laminations during molding.

What is claimed is:
1. A prevulcanized tire tread strip having:
   a plurality of parallel projecting tread ribs separated by tread grooves, thereby having a tread rib area and a void area,
   said ribs extending completely across the tread strip and being disposed in groups of at least two ribs per group,
   said groups being spaced apart by major tread grooves of zig-zag or serpentine shape and the ribs of each group being spaced apart by minor zig-zag or serpentine tread grooves of lesser width than said major grooves,
   said tread ribs having therein a plurality of closely spaced parallel uniformly-spaced slits which penetrate the ribs down to approximately 55% to 95% of the height of the ribs and which are spaced apart such that there are one to eight slits per inch,
   said slits extending completely across the tread strip and from one adjacent tread groove to another adjacent tread groove so as to divide each rib into a plurality of tread elements, said slits extending at an angle of 25° plus or minus 15° with respect to the transverse dimension of the tread strip and intersecting the tread rib edges at between about 45° and about 135°, the ratio of tread rib area to void area being in the range of about 1.5:1 to 8:1, and a plurality of tie bars having ends connecting tread elements on one side of a minor groove with tread elements on the other side of the same minor groove, said tie bars having longitudinal dimensions between said ends sufficient to substantially prevent severance of said tie bars between their respective ends by said slits, said tie bars extending across their respective grooves and being integral with their respective tread elements, said major grooves being set free of tie bars.

2. A prevulcanized tire tread strip having:

a plurality of parallel projecting tread ribs separated by tread grooves, thereby having a tread rib area and a void area, said ribs extending completely across the tread strip and being disposed in groups of at least two ribs per group, said groups being spaced apart by major tread grooves of zig-zag or serpentine shape and the ribs of each group being spaced apart by minor zig-zag or serpentine tread grooves of lesser width than said major grooves, said tread ribs having therein a plurality of closely spaced parallel uniformly-spaced slits which penetrate the ribs down to approximately 55% to 95% of the height of the ribs and which are spaced apart such that there are one to eight slits per inch, said slits extending completely across the tread strip and from one adjacent tread groove to another adjacent tread groove so as to divide each rib into a plurality of tread elements, said slits extending at an angle of 25° plus or minus 15° with respect to the transverse dimension of the tread strip and intersecting the tread rib edges at between about 45° and about 135°, the ratio of tread rib area to void area being in the rage of about 1.5:1 to 8:1, and a plurality of tie bars having ends connecting tread elements on one side of a minor groove with tread elements on the other side of the same minor groove, said tie bars having longitudinal dimensions between said ends sufficient to ensure that if said uniformly-spaced slits divide any one of said tie bars into plural portions, each of said portions will remain integrally connected to its respective neighboring tread elements on both sides thereof, said tie bars extending across their respective grooves and being integral with their respective tread elements, said major grooves being free of tie bars.

3. A prevulcanized tire tread strip as in claim 1 or 2 wherein said tie bars are each spaced apart in said minor grooves by a distance approximately equal to the longitudinal dimension of said tie bars.

* * * * *